United States Patent [19]
Halligan

[11] Patent Number: 6,003,593
[45] Date of Patent: Dec. 21, 1999

[54] AUTOMOTIVE VEHICLE CLIMATE CONTROL SYSTEM

[75] Inventor: Joseph R. Halligan, Waterford, Mich.

[73] Assignee: Denso International America, Inc., Southfield, Mich.

[21] Appl. No.: 08/550,898

[22] Filed: Oct. 31, 1995

[51] Int. Cl.[6] .................................................. F25B 29/00
[52] U.S. Cl. .............................. 165/203; 165/42; 165/43; 165/127
[58] Field of Search ............................. 165/43, 42, 203, 165/202, 127

[56] References Cited

U.S. PATENT DOCUMENTS

| | | | |
|---|---|---|---|
| 2,655,092 | 10/1953 | Spooner | 165/127 |
| 2,746,726 | 5/1956 | Hoff | 165/127 |
| 2,871,677 | 2/1959 | Bradfield et al. | 165/127 |
| 3,834,451 | 9/1974 | Kozinski . | |
| 3,881,546 | 5/1975 | Otsuka et al. . | |
| 3,897,526 | 7/1975 | Morse et al. . | |
| 3,934,642 | 1/1976 | Coulson et al. . | |
| 4,223,720 | 9/1980 | d'Orsay et al. | 165/43 |
| 4,340,112 | 7/1982 | Sutoh et al. . | |
| 4,353,224 | 10/1982 | Nonogaki et al. . | |
| 4,401,013 | 8/1983 | Ohashi et al. . | |
| 4,407,354 | 10/1983 | Takishita et al. . | |
| 4,417,688 | 11/1983 | Schnaibel et al. | 165/203 |

(List continued on next page.)

FOREIGN PATENT DOCUMENTS

| | | | |
|---|---|---|---|
| 2400161 | 4/1979 | France | 165/42 |
| 0082622 | 7/1981 | Japan | 165/43 |
| 57-198112 | 12/1982 | Japan . | |
| 58-101813 | 6/1983 | Japan . | |
| 63-8011 | 1/1988 | Japan . | |
| 0305018 | 12/1988 | Japan | 165/43 |
| 1-186411 | 7/1989 | Japan . | |
| 3-139416 | 6/1991 | Japan | 165/42 |
| 6-101933 | 4/1994 | Japan . | |
| 61-178214 | 8/1996 | Japan . | |
| 1246803 | 9/1971 | United Kingdom | 165/43 |
| 1 278 202 | 6/1972 | United Kingdom . | |

OTHER PUBLICATIONS

Figure A showing a Class 8 truck climate control system publicly used prior to Oct. of 1995.
Figure B showing a Class 8 truck climate control system conceived by another company's inventor prior to Oct. of 1995.

*Primary Examiner*—John K. Ford
*Attorney, Agent, or Firm*—Harness, Dickey & Pierce, PLC

[57] ABSTRACT

An automotive vehicle climate control system is capable of simultaneously providing fully heated air exiting one air outlet while also providing fully cooled air exiting from a second air outlet. Another aspect of the present invention provides simultaneous and independently controlled air volumes exiting from two different air outlets while receiving air through one or more common air inlets. Yet another aspect of the present invention climate control system employs a single evaporator and two suction blowers arranged downstream of the evaporator. A further aspect of the present invention uses a single evaporator and two heaters angularly disposed in relation to each other. The automotive vehicle climate control system of the present invention further includes a single unit having a front heater and front outlet providing air flow forward of the unit, and a rear heater and rear air outlet providing air flow behind the unit. Still another aspect of the present invention harnesses a climate control unit mounted beneath an occupant seat wherein two and only two blowers are arranged within the unit. An additional aspect of the present invention climate control system achieves a single unit heating and cooling apparatus for simultaneously heating and/or cooling a semi-tractor truck cab and sleeper compartment. A further aspect of the present invention also includes a seat frame substructure in combination with a climate control unit. A method of operating the automotive vehicle climate control system of the present invention is also provided.

21 Claims, 4 Drawing Sheets

6,003,593
Page 2

U.S. PATENT DOCUMENTS

| | | | |
|---|---|---|---|
| 4,437,391 | 3/1984 | Eguchi et al. . | |
| 4,460,036 | 7/1984 | Yoshimi et al. . | |
| 4,477,018 | 10/1984 | Rathgeber | 165/203 |
| 4,482,009 | 11/1984 | Nishimura et al. . | |
| 4,537,245 | 8/1985 | Nishimura et al. . | |
| 4,586,652 | 5/1986 | Sakurai . | |
| 4,612,975 | 9/1986 | Ikari | 165/43 |
| 4,622,831 | 11/1986 | Grupa . | |
| 4,658,888 | 4/1987 | Sakurai et al. . | |
| 4,665,971 | 5/1987 | Sakurai . | |
| 4,711,295 | 12/1987 | Sakurai . | |
| 4,762,169 | 8/1988 | Andersen et al. . | |
| 4,800,951 | 1/1989 | Sakurai . | |
| 4,802,405 | 2/1989 | Ichitani et al. . | |
| 4,819,715 | 4/1989 | Kobayashi . | |
| 4,821,531 | 4/1989 | Yamauchi et al. . | |
| 4,873,837 | 10/1989 | Murray . | |
| 4,874,036 | 10/1989 | Masuda . | |
| 4,895,002 | 1/1990 | Ishioka et al. | 165/127 |
| 4,898,325 | 2/1990 | Sakurada . | |
| 4,899,809 | 2/1990 | Takenaka et al. . | |
| 4,901,788 | 2/1990 | Doi . | |
| 4,913,347 | 4/1990 | Burst et al. . | |
| 4,940,083 | 7/1990 | Takenaka et al. . | |
| 4,949,779 | 8/1990 | Kenny et al. | 165/203 |
| 4,959,974 | 10/1990 | Kusakabe . | |
| 5,016,704 | 5/1991 | Ono . | |
| 5,036,680 | 8/1991 | Fujiwara et al. . | |
| 5,042,566 | 8/1991 | Hildebrand . | |
| 5,042,567 | 8/1991 | Kajimoto et al. . | |
| 5,062,473 | 11/1991 | Ostrand et al. | 165/42 |
| 5,086,628 | 2/1992 | Hashimoto . | |
| 5,101,883 | 4/1992 | Kinmartin et al. . | |
| 5,137,082 | 8/1992 | Shimoya et al. . | |
| 5,142,881 | 9/1992 | Nagayama . | |
| 5,154,223 | 10/1992 | Ishimura et al. . | |
| 5,162,020 | 11/1992 | Asano et al. . | |
| 5,165,595 | 11/1992 | Horio et al. . | |
| 5,172,759 | 12/1992 | Shimoya et al. . | |
| 5,180,004 | 1/1993 | Nguyen . | |
| 5,181,553 | 1/1993 | Doi . | |
| 5,184,478 | 2/1993 | Kutsuna et al. . | |
| 5,190,096 | 3/1993 | Taniguchi et al. | 165/43 |
| 5,195,574 | 3/1993 | Tanaka et al. . | |
| 5,199,272 | 4/1993 | Yamanaka et al. . | |
| 5,209,081 | 5/1993 | Matsuoka . | |
| 5,237,828 | 8/1993 | Kutsuna . | |
| 5,245,843 | 9/1993 | Shimoya et al. . | |
| 5,273,105 | 12/1993 | Higashihara et al. . | |
| 5,291,941 | 3/1994 | Enomoto et al. . | |
| 5,299,431 | 4/1994 | Iritani et al. . | |
| 5,301,520 | 4/1994 | Kitamura et al. . | |
| 5,309,731 | 5/1994 | Nonoyama et al. . | |
| 5,333,678 | 8/1994 | Mellum et al. . | |
| 5,335,718 | 8/1994 | Smith . | |
| 5,337,802 | 8/1994 | Kakjino et al. . | |
| 5,340,021 | 8/1994 | Kajino et al. . | |
| 5,344,069 | 9/1994 | Narikiyo . | |
| 5,355,690 | 10/1994 | Iritani et al. . | |
| 5,390,728 | 2/1995 | Ban . | |
| 5,392,845 | 2/1995 | Honda et al. . | |
| 5,450,894 | 9/1995 | Inoue et al. | 165/43 |
| 5,619,862 | 4/1997 | Ruger et al. | 165/202 |

AUTOMOTIVE VEHICLE CLIMATE CONTROL SYSTEM

BACKGROUND OF THE INVENTION

This invention relates generally to climate control systems and specifically to an automotive vehicle climate control system within which the air temperature and/or air volume exiting from two air outlets can be independently controlled.

In automotive vehicles, it is common to have a climate control system located within an instrument panel which provides heated or cooled air to front seat occupants through dash panel defrost air outlets, instrument panel venting air outlets and floor directed air outlets. These traditional climate control systems often include a centralized duct and air outlet extending between or below the front occupant seats to supply heated or cooled air to rear seat passengers. Examples of such automotive vehicle climate control systems are disclosed within the following U.S. Pat. Nos.: 5,392,845 entitled "Air-Conditioning Device" which issued to Honda et al. on Feb. 28, 1995; 5,390,728 entitled "Air Conditioner for Use in a Vehicle" which issued to Ban on Feb. 21, 1995; 5,337,802 entitled "Vehicle Air Conditioner Having Driver and Passenger Units Which Operate Independently of One Another" which issued to Kajino et al. on Aug. 16, 1994; 5,237,828 entitled "Air-Conditioner for an Automobile with Non-Azeotropic Refrigerant Mixture Used to Generate "Cool Head" and "Warm Feet" Profile" which issued to Kutsuna on Aug. 24, 1993; 5,042,567 entitled "Air Conditioner for a Vehicle" which issued to Kajimoto et al. on Aug. 27, 1991; 4,940,083 entitled "Apparatus for Conditioning Air for a Vehicle Compartment" which issued to Takenaka et al. on Jul. 10, 1990; 4,913,347 entitled "Air-Conditioning System for an Air-Cooled Motor Vehicle" which issued to Burst et al. on Apr. 3, 1990; 4,899,809 entitled "Automotive Air Conditioner System with Automatic Adjustment of Discharge Air Temperature" which issued to Takenaka et al. on Feb. 13, 1990; 4,898,325 entitled "Automobile Air Conditioner with Separate Flow Adjustment for Central and Side Vents" which issued to Sakurada on Feb. 6, 1990; 4,340,112 entitled "Vehicle Air Temperature Control Apparatus" which issued to Sutoh et al. on Jul. 20, 1982; 3,934,642 entitled "Vehicle Air Conditioning System" which issued to Coulson et al. on Jan. 27, 1976; and 3,881,546 entitled "Air Conditioner for Automotive Vehicles" which issued to Otsuka et al. on May 6, 1975. A limitation of most, if not all, of these traditional climate control systems is that the air temperature and air volume exiting from different outlets cannot be separately controlled due to common heat exchanger or blower components disposed within the unit.

A further limitation is apparent with regard to climate control systems employed within semi-tractor trucks, also known as class 8 trucks, which have a sleeper compartment and a cab containing front occupant seats. A pair of separately located climate control units are usually provided within these long distance trucks, one unit for heating and cooling the front cab and another unit for heating and cooling the sleeper compartment. Thus, a cab blower, evaporator and heater are located near or in an instrument panel while a rear blower, evaporator and heater are located within the sleeper compartment. One such example of this type of truck environmental control system is disclosed within U.S. Pat. No. 5,333,678 entitled "Auxiliary Power Unit" which issued to Mellum et al. on Aug. 2, 1994; the disclosure of which is incorporated by reference herewithin.

Another known tractor truck environmental control unit has been integrated into a single unit for positioning beneath a passenger front occupant seat within the truck's cab. The unit is mounted to a floor and subfloor within the cab while the passenger seat is affixed on top of a housing for this unit. Within this truck environmental control system, a pair of blowers push air from a common inlet, through a single evaporator, then through a single heater arranged downstream of the evaporator, after which, a portion of the heated or cooled air is allowed to exit from a front air outlet; concurrently, another portion of the air is directed out of a rear air outlet by another blower arranged downstream of the heater. It is believed that the air within this unit flows in a generally circular pattern between the air inlet and the rear air outlet. All of the air within this unit flows through the evaporator and most, if not all of the air within the unit flows through the heater core. Accordingly, a water valve and a heater air bypass door are used to control and vary the heater core performance, however, this is a fairly inaccurate method of temperature regulation. It is further believed that the air flow pattern within this truck climate control unit is overly complex and inefficient. Additionally, the air temperature exiting from the front and rear air outlets cannot be independently controlled but the air volume can be independently controlled.

Also of interest, a dual environmental control system employed in a bus is disclosed within U.S. Pat. No. 4,622,831 entitled "Air-Conditioning Plant for Motor Vehicles, Especially for Buses" which issued to Grupa on Nov. 18, 1986. Other conventional heating and air conditioning systems and their reversing air flow patterns are disclosed within U.S. Pat. Nos. 4,874,036 entitled "Heating and Air Conditioning System for a Forklift" which issued to Masuda on Oct. 17, 1989, and 4,401,013 entitled "Air Conditioning Device" which issued to Ohashi et al. on Aug. 30, 1983.

SUMMARY OF THE INVENTION

In accordance with the present invention, the preferred embodiment of an automotive vehicle climate control system is capable of simultaneously providing fully heated air exiting one air outlet while also providing fully cooled air exiting from a second air outlet. Another aspect of the present invention provides simultaneous and independently controlled air volumes exiting from two different air outlets while receiving air through one or more common air inlets wherein only one blower is used to push air out a front outlet. Yet another aspect of the present invention climate control system employs a single evaporator and two suction blowers arranged downstream of the evaporator. A further aspect of the present invention uses a single evaporator and two heaters angularly disposed in relation to each other. The automotive vehicle climate control system of the present invention further includes a single unit having a front heater and front outlet providing air flow forward of the unit, and a rear heater and rear air outlet providing air flow behind the unit. Still another aspect of the present invention harnesses a climate control unit mounted beneath an occupant seat wherein two and only two blowers are arranged within the unit. An additional aspect of the present invention climate control system achieves a single unit heating and cooling apparatus for simultaneously heating and/or cooling a semi-tractor truck cab and sleeper compartment. A further aspect of the present invention also includes a seat frame substructure in combination with a climate control unit. A method of operating the automotive vehicle climate control system of the present invention is also provided.

The automotive vehicle climate control system of the present invention is highly advantageous over conventional devices since the present invention consists of a single unit heating and cooling device simultaneously and independently operable to provide differing air temperatures and air volumes exiting from a first air outlet as compared to those exiting from a second outlet. Thus, auxiliary climate control units are rendered unnecessary while vehicle occupants can enjoy more individually tailored and comfortable temperature ranges and air flow volumes. This is especially important in larger vehicles such as tractor trucks, vans, station wagons or the like. Furthermore, the present invention is advantageous by employing a pair of independently operated blower and heater sets, in combination with a single evaporator, thereby achieving a cost effective, relatively lightweight and compact unit. This allows for ease of installation and ease of placement within otherwise unusable space below an occupant's seat. Moreover, only one expansion valve is required for operation of the present invention climate control system. The seat frame substructure of the present invention is also advantageous by preventing occupant and seat weight from being directly placed upon the climate control unit; this allows for use of less expensive and lighter weight climate control unit housing materials. Additional advantages and features of the present invention will become apparent from the following description and appended claims, taken in conjunction with the accompanying drawings.

DETAILED DESCRIPTION OF THE PREFERRED EMBODIMENT

Figure 1:
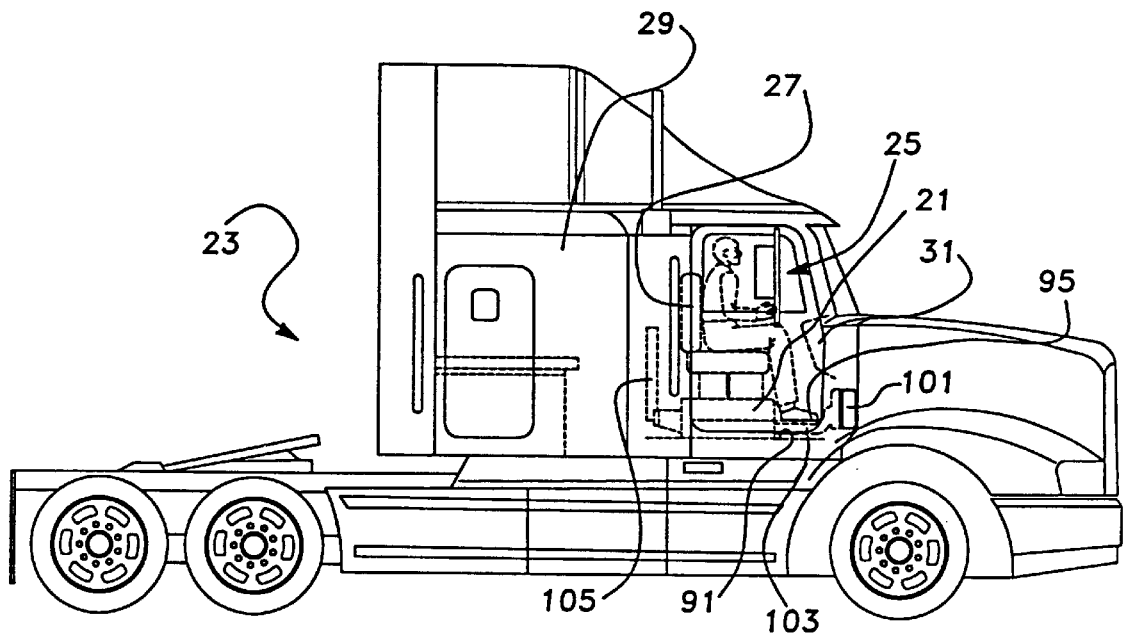
FIG. 1 is a side elevational view showing the preferred embodiment of the automotive vehicle climate control system of the present invention employed in a tractor truck.

In accordance with the present invention, a climate control unit 21 is disposed within a semi-tractor truck 23, also known as a class 8 truck. This is shown in FIG. 1. Truck 23 has a cab 25 within which is located a driver and passenger occupant seat 27, each of which is defined by a back section, a bottom section and a seat fame. The seat frame includes pneumatically controlled seat height adjustment cylinders. A sleeper compartment 29 is located within truck 23 behind seats 27. Sleeper compartment 29 typically includes a bed, a closet, a desk or the like. An instrument panel 31 is also located within cab 25.

Referring to FIGS. 3–6, the preferred embodiment of climate control unit 21 includes a housing 41, a fresh air inlet 43, a front recirculation air inlet 45, a side recirculation air inlet 47, an evaporator 49, an expansion valve 51, a rear or sleeper heater 53, a rear or sleeper blower 55, a rear or sleeper air outlet 57, a front or cab blower 59, a front or cab heater 61 and a front or cab air outlet 63. Housing 41 is defined by an upper casing 81 and a lower casing 83. A horizontal flange 85 peripherally extends outward from a bottom edge of upper casing 81. Lower casing 83 has a relatively smaller outwardly extending peripheral flange 87 for fastening, by way of screws, to flange 85. Casings 81 and 83 are made from sheet aluminum when seat 27 (see FIG. 1) is directly affixed on top of climate control unit 21 without additional seat frame support. Alternately, it is also envisioned that lower casing 83 can be injection molded or otherwise formed from a 20% talc filled polypropylene polymeric material. Notwithstanding, upper casing 81 would continue to be stamped or otherwise formed from aluminum to support the seat frame.

Lower casing 83 is mounted to a floor 91 (see FIG. 1) within the truck cab by way of four threaded pedestals 93 and nuts (not shown). The remainder of lower casing 83 fits through a coincidental aperture within a subfloor 95 whereby flange 85 of upper casing 81 can be screwed onto subfloor 95. Subfloor 95 (see FIG. 1) provides a footrest surface for cab occupants.

Figure 3:
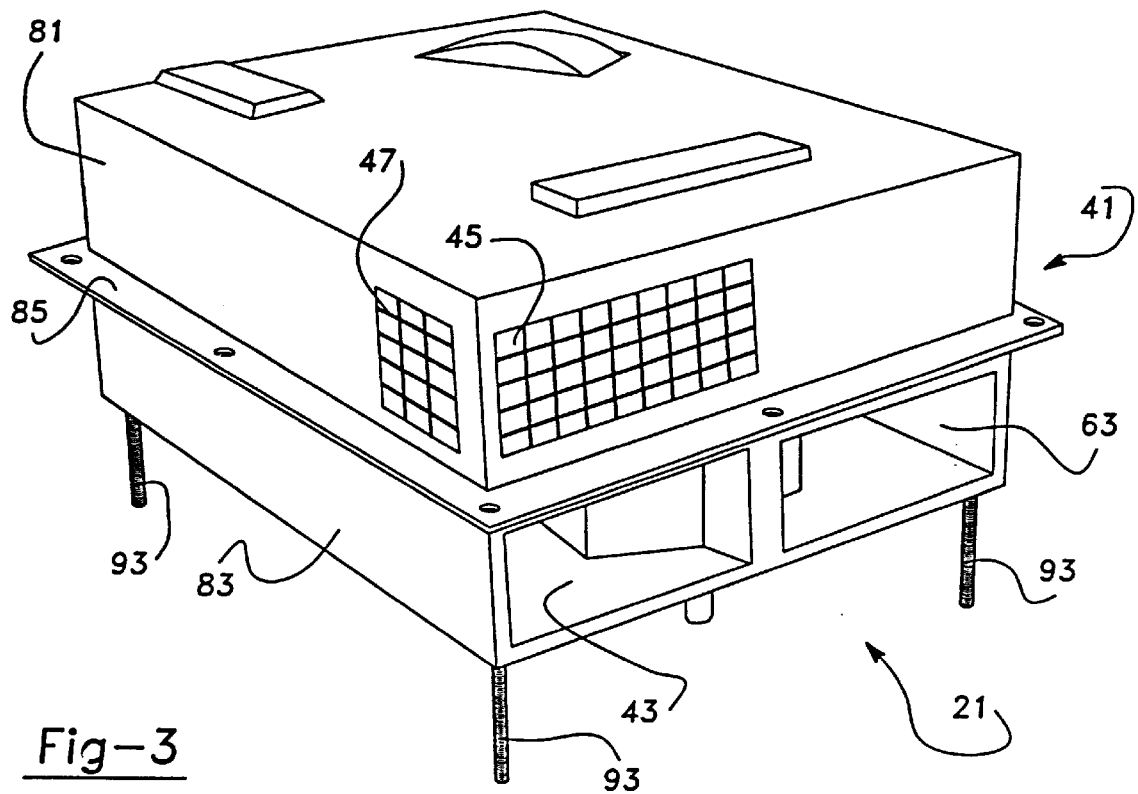
FIG. 3 is a perspective view showing the preferred embodiment of the present invention automotive vehicle climate control system.
Figure 4:
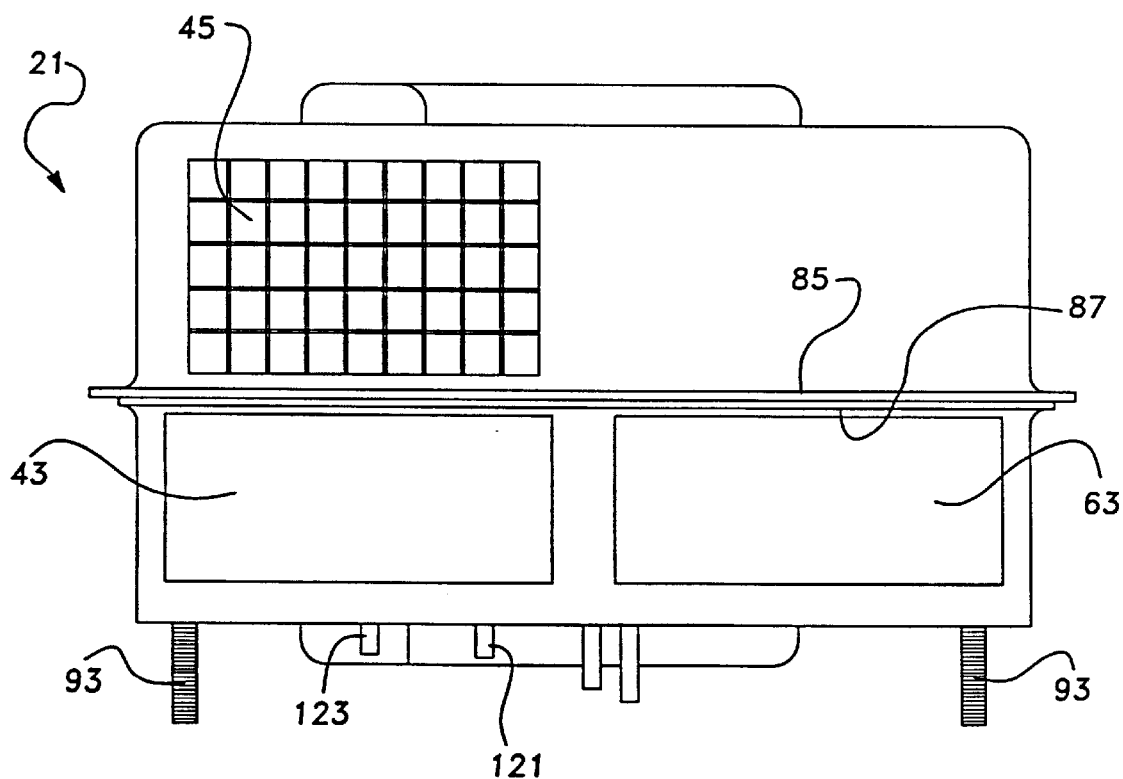
FIG. 4 is a front elevational view showing the preferred embodiment of the present invention automotive vehicle climate control system.
Figure 5:
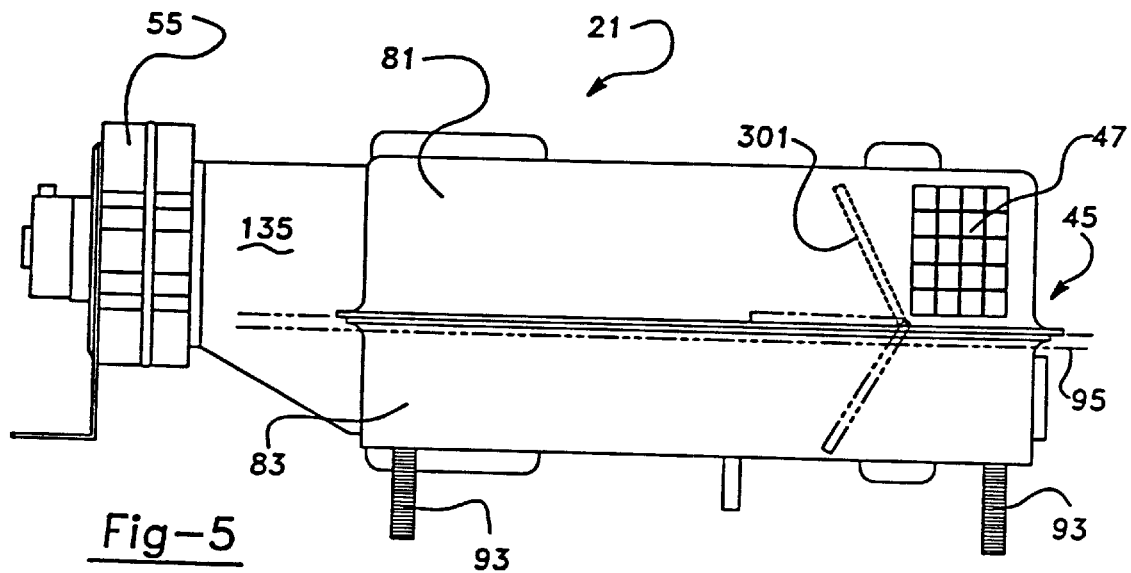
FIG. 5 is a side elevational view showing the preferred embodiment of the present invention automotive vehicle climate control system.

Referring to FIGS. 1 and 3, an external air inlet and hatch 101 are provided on a passenger side vehicle outer panel for receiving fresh air from outside the vehicle. A front duct 103 sealably spans between external air inlet 101 and fresh air inlet 43 of climate control unit 21 for providing a fresh air passageway. A front outlet duct (not shown) and occupant accessible outlets (for defrost, vent and floor oriented heater outlet modes) are sealably attached to and extend from front outlet 63. Similarly, a rear duct 105 and sleeper compartment accessible outlet are sealably coupled to and extend from rear outlet 57 (see FIG. 6). These ducts are preferably blow molded from a high density polyethylene polymer. Additionally, as can be observed in FIGS. 5 and 6, a fresh/recirculation door 301 is pivotably movable between an upward fresh air position blocking recirculating air entry, a downward recirculating air position blocking fresh air entry, or to an intermediate mixing position.

Figure 6:
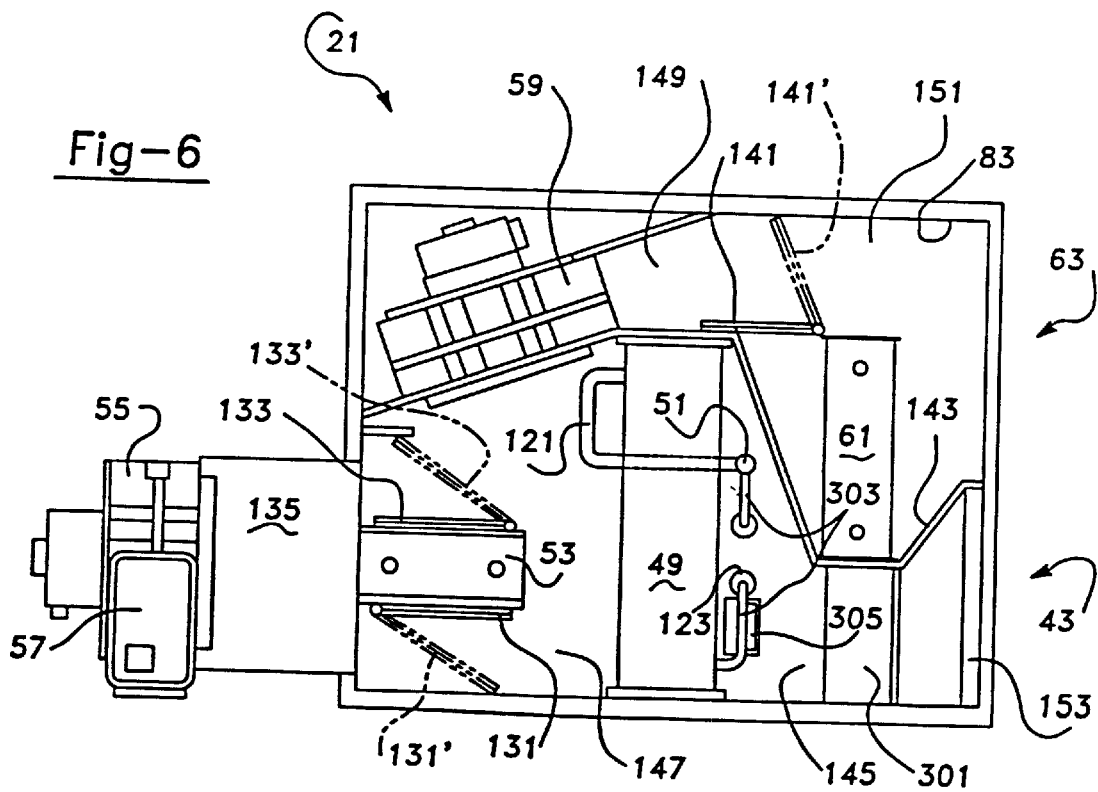
FIG. 6 is a top elevational view, with an upper casing removed, showing the preferred embodiment of the present invention automotive vehicle climate control system.

Turning now to FIG. 6, evaporator 49 is mounted to lower casing 83 and is arranged downstream and generally parallel to fresh air inlet 43. Evaporator 49 can be constructed in a conventional manner as is disclosed in the following commonly assigned U.S. Pat. Nos.: 5,245,843 entitled "Evaporator" which issued to Shimoya et al. on Sep. 21, 1993; 5,137,082 entitled "Plate-Type Refrigerant Evaporator" which issued to Shimoya et al. on Aug. 11, 1992; and 4,821,531 entitled "Refrigerant Evaporator" which to Yamauchi et al. on Apr. 18, 1989; the disclosures of which are all incorporated by reference herewithin. A serpentine evaporator 49 has been used, however, a more complex evaporator may be preferable from a performance standpoint, which exhibits more uniform cooling properties. A liquid refrigerant inlet 121 and a suction type refrigerant outlet 123 couple evaporator 49 to flexible hoses (not shown) extending below floor 91 (see FIG. 1) by way of capillary tubes 303 and expansion valve 51. The hoses are coupled to a receiver/dryer, condenser and compressor. The receiver/dryer, condenser and compressor are located within the vehicle engine compartment and are not considered to be part of the climate control unit. An insulated bulb 305 is attached to capillary tube 303 leading to outlet 123 so as to measure the refrigerant temperature for opening and closing expansion valve 51.

Rear heater 53 is arranged downstream of evaporator 49 with its air openings oriented generally perpendicular to the faces of evaporator 49. Immediately adjacent to each air opening of rear heater 53 there are closure devices or doors 131 and 133 which are pivotably movable from closed positions (as shown in solid lines) to open positions 131' and 133' (as shown in phantom lines). A constricting rear passageway or adaptor 135 is sealably joined upon a rear surface of housing 41 (see FIG. 5) for transferring air downstream from rear heater 53 to rear blower 55.

Offset and angularly disposed in relation to rear heater 53 and rear blower 55, front heater 61 is arranged downstream and off to the side of evaporator 49. Blowers 55 and 59 are both of a standard centrifugal or Sirocco type in which the air flow out of the fan blades are approximately 90° from the air flow into the fan blades. A closure device or door 141 is arranged downstream of front blower 59 for pivotable movement between a heater closing position (as shown in solid lines) to a heater open position 141' (as shown in phantom lines). Front heater 61 is arranged downstream of front blower 59 and door 141. Both heaters 53 and 61 are of an aluminum U-turn variety and are affixed to lower casing 83. Front air outlet 63 is further arranged downstream of front heater 61. A generally N-shaped partition 143 is sealingly disposed between a first set of passageways 145 and 147 and a second set of passageways for forward air flow 149 and 151. A fresh air dust filter 153 is also employed immediately downstream of fresh air inlet 43. Various foam insulators and other seals are disposed within climate control unit 21.

Figure 2:
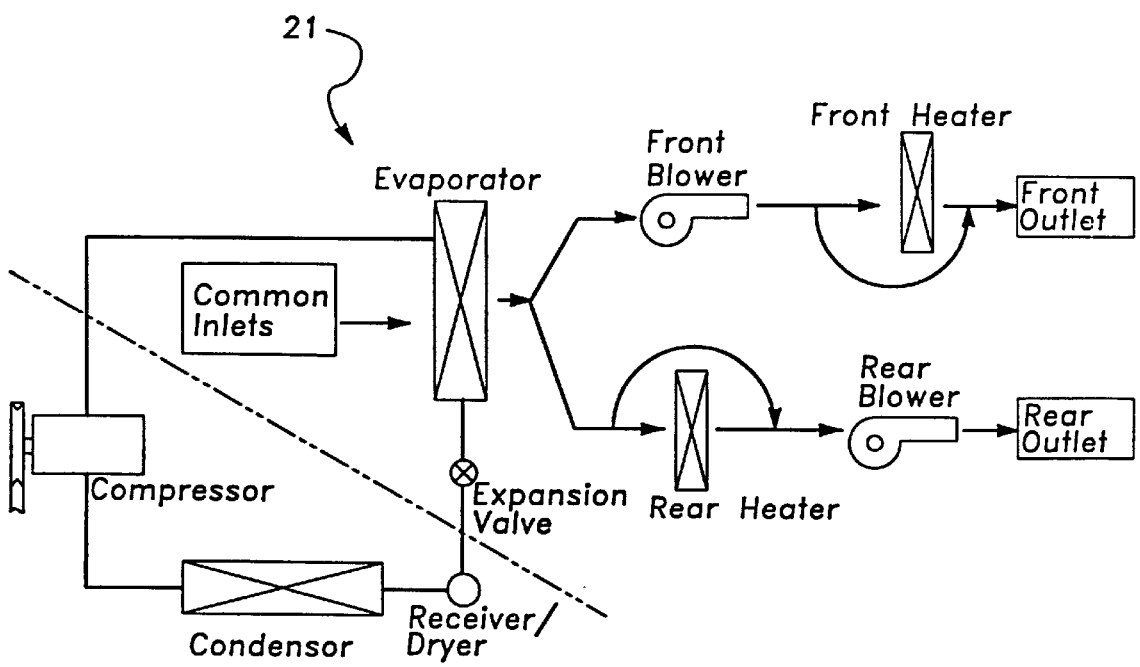
FIG. 2 is a diagrammatic view showing the preferred embodiment of the present invention automotive vehicle climate control system.
Figure 7:
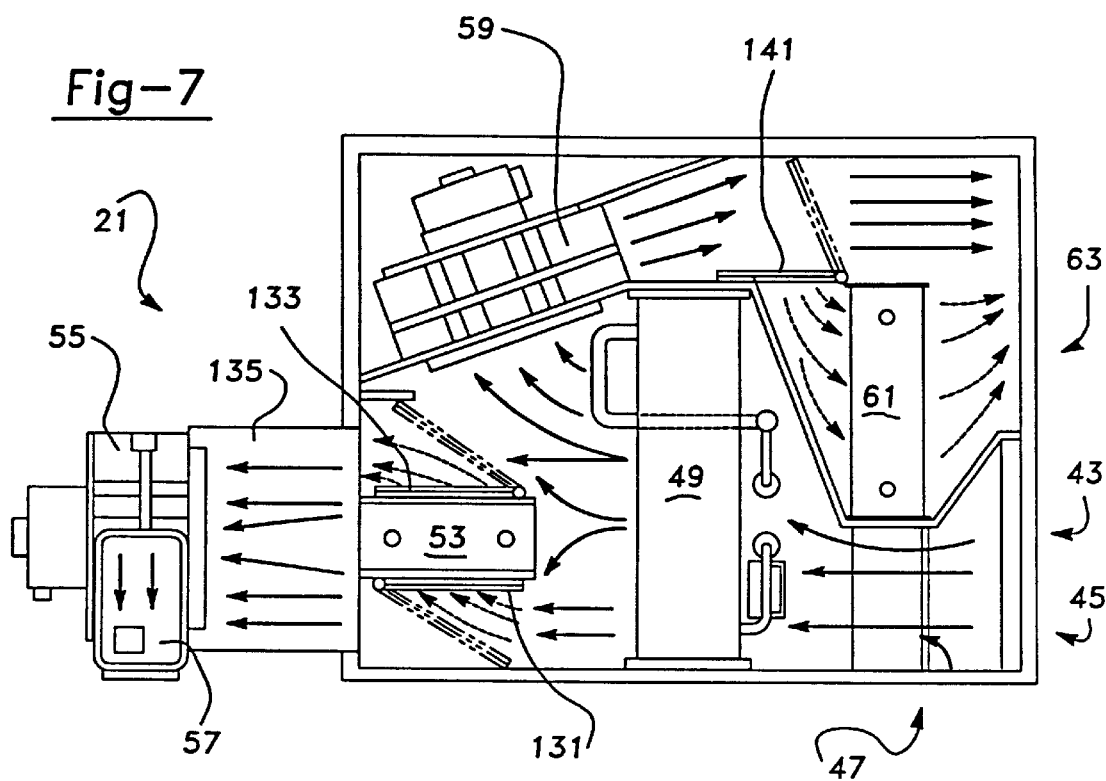
FIG. 7 is a top elevational view, similar to that of FIG. 6, showing air flow patterns within the preferred embodiment of the present invention automotive vehicle climate control system.

The air flow patterns within climate control unit 21 can best be observed in FIGS. 2 and 7. As selectively controlled by the vehicle occupants, air can either enter through the common fresh air inlet 43, combination fresh and recirculation air inlets, or the common recirculation air inlets 45 and 47. All of this air then passes through evaporator 49. Evaporator 49 operably cools all of this air when an air conditioning control is actuated. When doors 131 and 133 are moved to close rear heater 53, the portion of air flowing rearward bypasses around heater 53. This rearwardly directed air is further drawn into adaptor 135 through a suction or pulling action created by rear blower 55. Rear blower 55 then expels this rearwardly directed portion of air out rear outlet 57. Simultaneously, when selectively actuated, another portion of air is sucked, drawn and pulled from evaporator 49 and into front blower 59 at which point it is expelled in a generally forward direction. This forwardly directed air is then allowed to bypass front heater 61 when door 141 closes off front heater 61 thereby creating a full cooling function. This cooled air is then forced to exit front air outlet 63. If the operator selectively controls climate control unit 21 to heat air being directed rearward or forward, then doors 131 and 133 and/or door 141 can be opened in infinitely varying amounts until full air supply is directed through heaters 53 and 61 for creating a full heating function.

Heaters 53 and 61 are always being operated when the vehicle engine is running, however, air is only heated when doors 131, 133 and 141 allow air entry therethrough. These air mix doors allow optimal temperature control, independently operable between forward and rearward air flow patterns, especially when compared to conventional reheat or water valve heater systems. Concurrently, evaporator 49 can be selectively turned on and off. Thus, when the vehicle occupant's desire cooled forward air simultaneous with heated rearward air, evaporator 49 cools all the air flowing therethrough, after which air is bypassed around the closed front heater and air is heated by flowing through rear heater 53, and visa versa. In a full cool mode, climate control unit 21 will theoretically provide discharge air temperature at 5° Celsius. In a full hot mode, climate control unit 21 will theoretically provide discharge air temperature at 65° Celsius; these temperatures are measured at the end of the air outlets (i.e., at points 57 and 63). Additionally, the optimum blower motor power consumption is less than or equal to 300 watts per blower motor while maintaining a full front air flow volume of greater than or equal to 500 meters$^3$/hour and a full blower rear air flow volume at greater than or equal to 350 meters$^3$/hour (as measured at the duct outlets) in a maximum air conditioning (full cold) mode with full blower speed, face venting and recirculating air entry.

Figure 8:
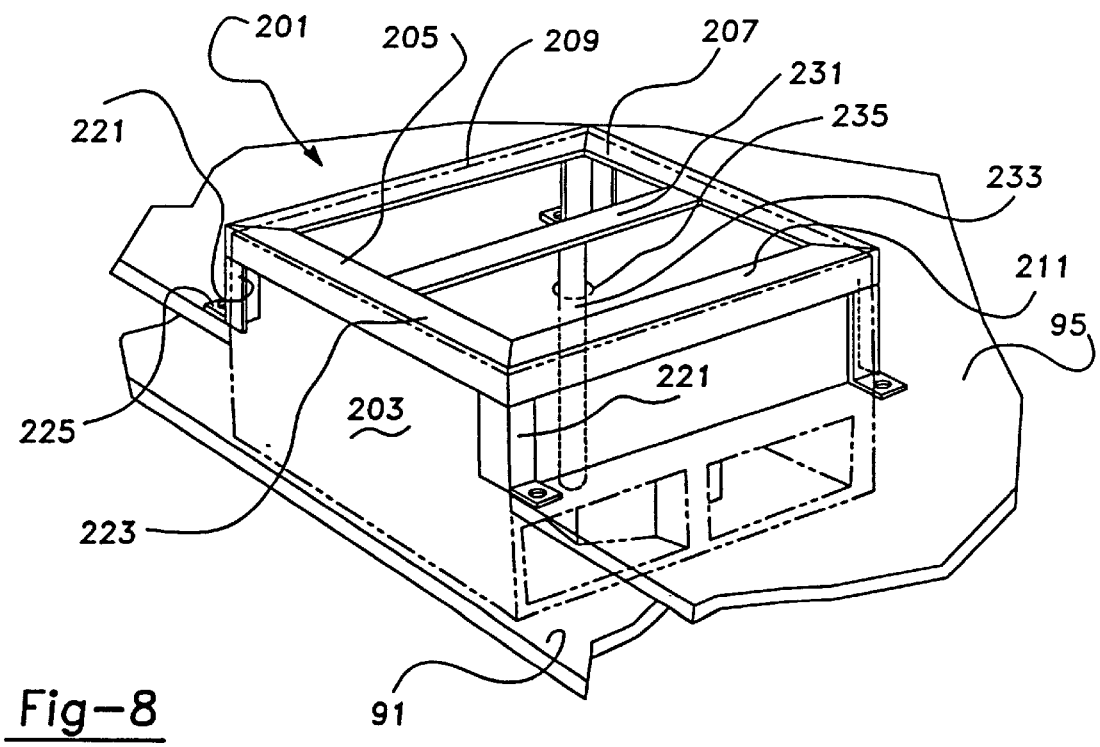
FIG. 8 is a perspective view showing an alternate embodiment climate control unit and seat frame substructure of the present invention automotive vehicle climate control system.

FIG. 8 illustrates an alternate embodiment of the present invention automotive vehicle climate control system wherein a steel seat frame substructure 201 surrounds an upper portion of a climate control unit housing 203. Substructure 201 comprises a pair of generally U-shaped rails 205 and 207 welded to cross beams 209 and 211. Each rail 205 is defined by a pair of generally vertically oriented or rising supports 221 with a main beam 223 spinning therebetween. A generally horizontal flange 225 outwardly extends from a distal end of each support 221. These flanges 225 are screwed to subfloor 95. This substructure is preferably made from L-cross sectionally-shaped angle iron bars or alternately tubular members.

A seat frame is bolted directly onto main beams 223. Accordingly, since the climate control unit does not have to directly support the occupant's and seat's weight, its housing 203 can be entirely made from a polymeric material thereby having lighter weight and less costly properties. Notwithstanding, if additional seat support is required, a median cross beam 231 and a central post 233 can optionally be added to substructure 201. Accordingly, a cylindrical passthrough 235 would need to be formed within climate control unit 203 such that post 233 can rest directly against floor 91.

While the preferred embodiment of this automotive vehicle climate control system has been disclosed, it will be appreciated that various modifications may be made without departing from the present invention. For example, the specific order of heaters, blowers and the evaporator can be rearranged while retaining various of the other novel aspects of the present invention. Furthermore, the present invention climate control system can be implemented in a passenger car, minivan or the like. Moreover, other blower types (such as elongated but thin dual shaft blowers) can be placed within the actual duct work extending from the climate control unit. The climate control unit can alternately be placed within an instrument panel, under a floor, on a roof or under a minivan bench seat (behind the front seats). It is also envisioned that the air flow patterns and outlet placements may be varied while retaining other aspects of the present invention. Various materials have been disclosed in an exemplary fashion, however, other materials may of course be employed. It is intended by the following claims to cover these and any other departures from the disclosed embodiments which fall within the true spirit of this invention.

What is claimed is:

1. An automotive vehicle climate control system comprising:

a recirculating air inlet;

a fresh air inlet;

a first air outlet arranged downstream from said air inlets;

a second air outlet;

a single evaporator arranged between said air inlets and said first air outlet wherein all air being received through said air inlets passes through said evaporator;

a first blower arranged downstream from said evaporator;

a second blower arranged downstream from said evaporator and selectively causing at least a portion of said air to exit said second air outlet; and a first heater arranged between said evaporator and said first blower, said first heater operably heating a first portion of said air flowing to said first blower but not substantially heating a second portion of said air flowing to said second blower;

a second heater arranged between said second blower and said second air outlet for operably heating any of said second portion of said air flowing therethrough;

said blowers being operable to pull said air through said air inlets and through said evaporator, at least one of said blowers being further operable to push said air out of said second air outlet;

said second air outlet being positioned adjacent to at least one of said air inlets such that said second portion of said air which flows out of said second air outlet must flow in a substantially U-shaped manner from the adjacent one of said air inlets.

2. The automotive vehicle climate control system of claim 1 further comprising an entry face of said evaporator being substantially parallel to said fresh air inlet and said second heater.

3. The automotive vehicle climate control system of claim 1 wherein said second air outlet is juxtapositioned adjacent to at least one of said air inlets and said first portion of said air which flows out of said first air outlet must flow in a substantially L-shaped manner from said fresh air inlet and through said first heater.

4. The automotive vehicle climate control system of claim 1 wherein said first air outlet allows a portion of said air to flow rearward of said evaporator while said second air outlet allows another portion of said air to exit forward of said evaporator.

5. The automotive vehicle climate control system of claim 1 further comprising a single housing containing said evaporator, said blowers, said air inlets and said second air outlet.

6. An automotive vehicle climate control system comprising:

a recirculating air inlet;

a fresh air inlet;

a first air outlet arranged downstream from said air inlets;

a second air outlet;

a single evaporator arranged between said air inlets and said first air outlet wherein all air being received through said air inlets passes through said evaporator;

a first blower arranged downstream from said evaporator;

a second blower arranged downstream from said evaporator and selectively causing at least a portion of said air to exit said second air outlet;

a first heater arranged between said evaporator and said first blower, said first heater operably heating a first portion of said air flowing to said first blower but not substantially heating a second portion of said air flowing to said second blower;

a second heater arranged between said second blower and said second air outlet for operably heating any of said second portion of said air flowing therethrough;

said blowers being operable to pull said air through said air inlets and through said evaporator, at least one of said blowers being further operable to push said air out of said second air outlet, at least a portion of said air selectively flowing in a substantially U-shaped path to exit said second air outlet;

a first closure device infinitely movable to direct predetermined amounts of said air through said first heater, said first closure device further being movable to cause predetermined amounts of said air to bypass around said first heater and toward said first blower; and a second closure device infinitely movable to direct predetermined amounts of said air through said second heater, said second closure device being further movable to cause predetermined amounts of said air to bypass around said second heater and out of said second outlet.

7. The automotive vehicle climate control system of claim 6 further comprising an entry face of said evaporator being substantially parallel to said second heater and substantially perpendicular to said first heater.

8. An automotive vehicle climate control system comprising:

an air inlet;

a first air outlet arranged downstream from said air inlet;

a second air outlet arranged downstream from said air inlet;

a single evaporator arranged between said air inlet and said air outlets wherein all air being received through said air inlet passes through said evaporator;

a first blower arranged downstream from said evaporator;

a first heater arranged between said evaporator and said first air outlet; and a second heater arranged between said evaporator and said second air outlet, said second heater being substantially perpendicular to said first heater;

said second air outlet being positioned adjacent to said air inlet such that said second portion of said air which flows out of said second air outlet must flow in a substantially U-shaped manner from said air inlet.

9. The automotive vehicle climate control system of claim 8 further comprising a second blower arranged downstream from said evaporator and supplying a portion of said air to said second air outlet.

10. The automotive vehicle climate control system of claim 9 wherein said second blower is arranged upstream from said second heater for selectively pushing a predetermined amount of said air therethrough and also through said second air outlet.

11. The automotive vehicle climate control system of claim 8 wherein said first blower is arranged downstream from said first heater for selectively pulling a predetermined a mount of said air therethrough and for operatively pushing a portion of said air through said first air outlet.

12. The automotive vehicle climate control system of claim 8 wherein said first air outlet allows a portion of said air to flow rearward of said evaporator while a second air outlet allows another portion of said air to exit forward of said evaporator, said first heater is substantially perpendicular to said evaporator.

13. An automotive vehicle climate control system comprising:

an air inlet;

a first air outlet arranged downstream from said air inlet;

a second air outlet arranged downstream from said air inlet;

a single evaporator arranged between said air inlet and said air outlets wherein all air being received through said air inlet passes through said evaporator;

a first blower arranged downstream from said evaporator;

a first heater arranged between said evaporator and said first air outlet; and a second heater arranged between said evaporator and said second air outlet, said second heater being substantially perpendicular to said first heater;

a first closure device infinitely movable to direct predetermined amounts of said air through said first heater, said first closure device further being movable to cause predetermined amounts of said air to bypass around said first heater and toward said first blower; and a second closure device infinitely movable to direct predetermined amounts of said air through said second heater, said second closure device being further movable to cause predetermined amounts of said air to bypass around said second heater and out of said second outlet.

14. The automotive vehicle climate control system of claim 13 wherein said second air outlet is juxtapositioned adjacent to said air inlet such that said second portion of said air which flows out of said second air outlet must flow in a substantially U-shaped manner from said air inlet.

15. An automotive vehicle climate control system comprising:

a climate control unit housing;

an air inlet allowing air into said housing;

a first heater located in said housing downstream of said inlet;

a second heater located in said housing downstream of said inlet;

an evaporator located in said housing downstream of said inlet and upstream of at least one of said heaters;

a first air outlet located downstream of said first heater;

a second air outlet located downstream of said second heater;

said first heater being offset from a first air flow path of unheated air to said first outlet but being in a second air flow path of air to be heated and moved to said first outlet;

said second heater being located partially between said evaporator and said inlet but blocked from a third air flow path between said inlet and said evaporator; and a pivoting door operably controlling air flow between said first and second air flow paths.

16. The automotive vehicle climate control system of claim 15 further comprising:

a blower operable to cause air flow through at least one of said heaters.

17. The automotive vehicle climate control system of claim 16 further comprising:

a second blower arranged between said evaporator and one of said outlets; and a second air inlet provides access to recirculated vehicle air while said first air inlet provides access to fresh air.

18. The automotive vehicle climate control system of claim 17 further comprising:

a first closure device being infinitely movable to direct predetermined amounts of said air through said first heater, said first closure device further being movable to cause predetermined amounts of said air to bypass around said first heater and toward said first blower; and a second closure device being infinitely movable to direct predetermined amounts of said air through said second heater, said second closure device being further movable to cause predetermined amounts of said air to bypass around said second heater and out of said second outlet.

19. The apparatus of claim 16 wherein said climate control unit causes a portion of said air exiting from said first air outlet to be generally fully heated while simultaneously causing another portion of said air exiting from said second air outlet to be generally fully cooled.

20. The automotive vehicle climate control of claim 15 wherein said second air outlet is juxtapositioned adjacent to said air inlet such that said air which flows out of said second air outlet must flow in a substantially U-shaped manner from said air inlet.

21. The automotive vehicle climate control of claim 15 further comprising a flange outwardly and peripherally extending in a substantially horizontal manner around a midsection of said housing, and said air inlet being a fresh air inlet.

* * * * *